United States Patent [19]
Nakamura et al.

[11] Patent Number: 5,795,485
[45] Date of Patent: Aug. 18, 1998

| [54] | PROCESS FOR TREATING PHOTOGRAPHIC PROCESSING WASTE SOLUTION |
|---|---|
| [75] | Inventors: Takashi Nakamura; Haruhiko Iwano; Koji Matsuo, all of Kanagawa, Japan |
| [73] | Assignee: Fuji Photo Film Co.,Ltd., Kanagawa, Japan |
| [21] | Appl. No.: 399,658 |
| [22] | Filed: Mar. 7, 1995 |
| [30] | Foreign Application Priority Data |
| | Mar. 9, 1994 [JP] Japan .................................. 6-065744 |
| [51] | Int. Cl.$^6$ ................................................. C02F 1/52 |
| [52] | U.S. Cl. ................................. 210/714; 210/912 |
| [58] | Field of Search ........................... 210/663, 688, 210/521, 912, 714 |

[56] References Cited

U.S. PATENT DOCUMENTS

| 4,326,952 | 4/1982 | Blake .................. 210/521 |
| 5,605,633 | 2/1997 | Nakamura et al. ....... 210/732 |

FOREIGN PATENT DOCUMENTS

| 3-132656 | 6/1991 | Japan . |
| 6-118589 | 4/1994 | Japan . |
| 6-118594 | 4/1994 | Japan . |
| 6-258779 | 9/1994 | Japan . |

*Primary Examiner*—Ivars Cintins
*Attorney, Agent, or Firm*—Sughrue, Mion, Zinn, Macpeak & Seas, PLLC

[57] ABSTRACT

A process for treating a photographic processing waste solution which comprises:

placing a polymer precipitate in a lower portion of a tank having a U-shaped treating space which comprises (i) a first partition, (ii) a second partition and (iii) an interconnecting partition for interconnecting the first partition and the second partition in the lower portion of a tank;

introducing into the first partition a photographic processing waste solution containing a processing solution having fixing ability which has processed a silver halide photographic material;

treating the photographic processing waste solution in the U-shaped treating space in the presence of a polymer having S atom which can coordinate with a metal; and removing the metal in said photographic processing waste solution.

5 Claims, 7 Drawing Sheets

PROCESS FOR TREATING PHOTOGRAPHIC PROCESSING WASTE SOLUTION

FIELD OF THE INVENTION

The present invention relates to a process for treating a photographic processing waste solution discharged from a processing step of a silver halide photographic material (hereinafter also referred to as a photographic material), and more particularly to a process for removing silver contained in a photographic processing waste solution. The present invention further relates to a silver removing device used for conducting this process, and a photographic processing apparatus (photographic processor) equipped therewith.

BACKGROUND OF THE INVENTION

In photographic processing, black-and-white materials are processed through steps such as black-and-white development, fixing and washing after exposure, and color materials are processed through steps such as color development, silver removal, washing and stabilization after exposure. Black-and-white developing solutions are used for black-and-white development, fixing solutions for fixing, color developing solutions for color development, bleaching solutions, bleaching-fixing solutions and fixing solutions for silver removal processing, tap water or ion-exchanged water for washing, and stabilizing solutions for stabilization processing, respectively. The temperature of the respective processing solutions is usually adjusted to 20° to 50° C., and the photographic materials are immersed in these processing solutions for processing.

Of such processing steps, the washing processing and the stabilization processing for washing out fixing ingredients contained in emulsion layers and silver complex salts produced by the fixing processing are conducted to keep the stability of images after processing a solution having bleaching ability or fixing ability. Accordingly, the following ingredients carried by photographic materials are introduced into the processing solutions such as the washing water and the stabilizing solutions to accumulate at high concentrations. Such ingredients include silver ingredients such as silver complex salts contained in the fixing solutions; ion ingredients and silver ingredients contained in the bleaching solutions and the bleaching-fixing solutions; cerium ingredients contained in reducing processing solutions; aluminum ingredients contained in hardening fixing solutions; and further the fixing solutions, the bleaching solutions, the bleaching-fixing solutions, the reducing solutions and the hardening fixing solutions which are the prebaths.

The discharge of waste solutions containing such processing solution ingredients such as the silver ingredients into sewerages without treatment introduces a serious problem from the viewpoint of environmental protection. In particular, for the silver ingredients, silver regulations to the discharge of the processing waste solutions such as the washing water into sewerages and rivers is becoming rigorous because of their bactericidal action against microorganisms in activated sludge. In some regions of U.S.A., Europe and Philippines in Southeast Asia, the discharge of the processing waste solutions is permitted only when the silver content is less than 0.1 ppm, which necessitates some countermeasures. In the present specification, "ppm" means parts per million by weight. In some cases, the waste solutions are discharged into rivers or sewerages, negotiating with the sewer authorities to pay penalty fees. However, tremendous costs are required. Accordingly, large installations for removing silver are built at tremendous costs in large laboratories, or the discharge is permitted paying treating costs to the sewer authorities.

For example, as an indication of a regulation of a discharge standard of silver in the washing water in photographic processing, a description is given in "Information Ecology and Safety", Regulations Affecting the Discharge of Photographic Processing Solutions Kodak Publication No. J-102 (September, 1990). A value of "0.001 to 20 ppm" as a discharge standard of silver of a typical city sewer code appears in Table 1 thereof, and a silver regulation value of "0.5 to 5 ppm" for a photofinishing laboratory appears in Table 2 thereof.

The regulation standards of silver are also shown in the acts of U.S.A. enacted in 1986, "Safe Drinking Water Act", "Hazardous Materials Transportation Act" and "Toxic Substances Control Act". Further, the sewer regulations in U.S.A. become rigorous in many regions, with enforcement of "Clean Water Act Amended" of 1989.

Further, the regulations in Europe also become rigorous, and the discharge standards of silver into the sewers are 0.1 ppm or less.

The prior techniques for removing silver contained in the washing waste solutions include adsorption through ion-exchange resins, chemical sedimentation, metal substitution, electrolysis, electrodialysis and methods acceding to reverse osmosis membranes. Of these, the adsorption can be performed at a low cost, but has a limitation to achieve a silver removal level satisfying the rigorous discharge standards, because of the difficulty of regeneration of the ion-exchange resins. In the chemical sedimentation, techniques for separating precipitates are difficult, and maintenance is not easy. In the metal substitution, the problem of contamination caused by metals used for substitution is liable to be encountered. In the electrolysis, the use of a three-dimensional cathode and the control of potential are expected to improve the silver removal level, but there is the problem such as a limitation on an apparatus. The electrodialysis has many problems in terms of an apparatus, such as the adjustment of pressure balance. In the methods acceding to reverse osmosis membranes, the use of reverse osmosis equipment in two steps makes it possible to satisfy the discharge standards (Japanese Patent Application Nos. 4-296415 and 4-296416 (corresponding to JP-A-6-118594 and JP-A6-118589, respectively (the term "JP-A" as used herein means an "unexamined published Japanese patent application)) filed by the present applicant). However, there is a limitation on an apparatus such as the necessity of high pressure, and maintenance is not easy.

Recently, a method is proposed in which metals such as silver contained in processing solutions having fixing ability such as fixing solutions or in waste solutions of washing solutions such as washing water are recovered using water-soluble polymers which can coordinate with the metals such as silver in the waste solutions.

For example, JP-A-3-132656 discloses that the above-described water-soluble polymers are added to used fixing solutions or bleaching-fixing solutions to form precipitates of water-insoluble silver complexes, which are separated by filtration, thereby efficiently and easily removing silver ions accumulated in the fixing solutions, etc., and regenerating the fixing solutions, etc. to reduce the amount used of these processing solutions having fixing ability. According to this method, however, silver can be removed to such a degree that the fixing solutions, etc. are regenerated by treating the fixing solutions, etc. containing the silver ions accumulated in large amounts, but cannot be removed to a concentration at which the discharge into sewerages is possible.

As to the washing solutions such as washing water, the above-described water-soluble polymers are added to, for example, washing waste solutions to form precipitates, thereby removing silver contained in the washing waste solutions. For example, sulfur(S)-containing compounds (i) having monomer units in which hydrocarbon groups each having 1 to 3 carbon atoms have thiol groups, dithiocarbamine groups or the like as substituents and (ii) having a molecular weight of about 10,000 to 500,000 (referred to the later description) are generally used as the above-described water-soluble polymers. For such sulfur-containing water-soluble polymers, solutions having a high silver concentration increase the coordination rate of silver, so that the formation of precipitates preferably rapidly proceeds. However, diluted solutions having a low silver concentration decrease the coordination rate of silver, so that the polymers are liable to be kept water-soluble, resulting in the difficulty in forming precipitates. Namely, only the addition of the above-described polymers requires 1 to 3 days and nights to form precipitates, and wide space for formation of the precipitates is required in practical applications.

From such circumstances, the present applicant has proposed to add a water-soluble polymer having a number average molecular weight of 50,000 or more and a molecular weight distribution wherein the polymer having a molecular weight of 30,000 or less occupies 0.01% by weight or less in order to form a complex of silver in Japanese Patent Application No. 5-238945. It is described that, according to this, even if the coordination rate of silver is low and the polymer is kept water-soluble, the S atom-containing water-soluble polymer has a high molecular weight, so that the polymer and a polymer in which silver is coordinated do not leak in permeated water when treated with a filter which does not permeate the polymer, that is, with an ultrafiltration membrane (UF membrane), and therefore, the removal of silver can be ensured.

Further, Japanese Patent Application No. 5-320928 proposes to adjust the amount of a sulfur-containing water-soluble polymer added so as to be within the range of 0.5 to 4 of a metal equivalent, and to conduct microfiltration (MF) using a single layer membrane filter having a pore size of 0.05 to 10 µm. It is described that, according to this, a precipitate is specifically captured by the single layer membrane filter by filtration of the precipitate using the single layer membrane filter, resulting in possession of functions just as those of a composite membrane to give an effect equivalent to or more than that of treatment by use of the expensive UF membrane.

Furthermore, Japanese Patent Application No. 5-343463 proposes to add a sulfur-containing water-soluble polymer and to locate a cathode and an anode so as to exist at an air-liquid interface, followed by electrolysis treatment. It is described that, according to this, the formation of a precipitate is promoted and even silver having a low coordination rate is precipitated, which makes it possible to ensure the removal of silver by filtration.

However, all of the methods are mainly batch processes, and there is no difference in that wide treating space is required. Further, the method of Japanese Patent Application No. 5-238945 has the problems that there is complicated pretreatment for realizing the specified molecular weight distribution, and further that the desired effect can not be obtained unless the exchange frequency of the expensive UF membrane is increased. Furthermore, the method of Japanese Patent Application No. 5-320928 has the problem that it is required to repeat the filtration treatment operation until the MF membrane exhibits the functions of the UF membrane, and therefore, the effect is not immediately obtained, for example, when the method is used for a photographic processing waste solution having a dilute Ag concentration. In addition, in the method of Japanese Patent Application No. 5-343463, it is necessary to precisely control electrolysis treatment to obtain the maximum effect, resulting in complexity.

Accordingly, easy, efficient processes for forming precipitates are desired.

SUMMARY OF THE INVENTION

A first object of the present invention is to provide a process for treating a photographic processing waste solution in which the formation of a precipitate is promoted, continuous treatment is possible, and the removal of a metal, particularly silver, contained in the liquid can be ensured, when the metal in the photographic processing waste solution, particularly silver, is captured to form the precipitate by use of a polymer having an S atom which can coordinate with the metal, thereby removing the metal, particularly silver, in the liquid.

A second object is to provide a silver removing device which can efficiently remove silver contained in a photographic processing waste solution by continuous treatment, and which requires small space for its installation.

A third object is to provide a photographic processing apparatus (photographic processor) which is equipped with the above-described silver removing device, and which can reuse a photographic processing waste solution after the removal of silver.

Such objects can be attained by the following (1) to (8) of the present invention.

(1) A process for treating a photographic processing waste solution which comprises:

placing a polymer precipitate in a lower portion of a tank having a U-shaped treating space, wherein the polymer precipitate divides the U-shaped treating space to form two spaces;

introducing the photographic processing waste solution containing a processing solution having fixing ability which has processed a silver halide photographic material into one of the two spaces; and treating the photographic processing waste solution in the U-shaped treating space in the presence of a polymer having an S atom which can coordinate with a metal; and removing the metal contained in the photographic processing waste solution.

(2) The process for treating a photographic processing waste solution according to (1) described above, wherein a plurality of tanks each having the U-shaped treating space are provided, and the waste solution is allowed to flow in from a preceding stage tank to a subsequent stage tank in turn.

(3) The process for treating a photographic processing waste solution according to (1) or (2) described above, wherein the polymer precipitate is a colloidal precipitate.

(4) The process for treating a photographic processing waste solution according to any one of (1) to (3) described above, wherein the polymer precipitate is a precipitate obtained by insolubilizing the polymer having a S atom which can coordinate with a metal.

(5) The process for treating a photographic processing waste solution according to any one of (1) to (4) described above, wherein filtration treatment is further conducted to the solution after the treatment in the presence of the polymer having a S atom which can coordinate with a metal.

(6) The process for treating a photographic processing waste solution according to any one of (1) to (5) described above, wherein the photographic processing waste solution contains silver.

(7) A silver removing device comprising:

at least one tank having a U-shaped treating space in a lower portion of which a polymer precipitate is placed, wherein the polymer precipitate divides said U-shaped treating space to form two spaces;

a solution introducing means for introducing a silver-containing photographic processing waste solution into one of the two spaces;

an addition means for adding a polymer having an S atom which can coordinate with a metal to the U-shaped treating space; and a filtration treating means for subjecting the photographic processing waste solution which has been treated with the polymer having a S atom which can coordinate with a metal to filtration treatment.

(8) A photographic processing apparatus equipped with the silver removing device of (7) described above.

DETAILED DESCRIPTION OF THE INVENTION

Figure 1:
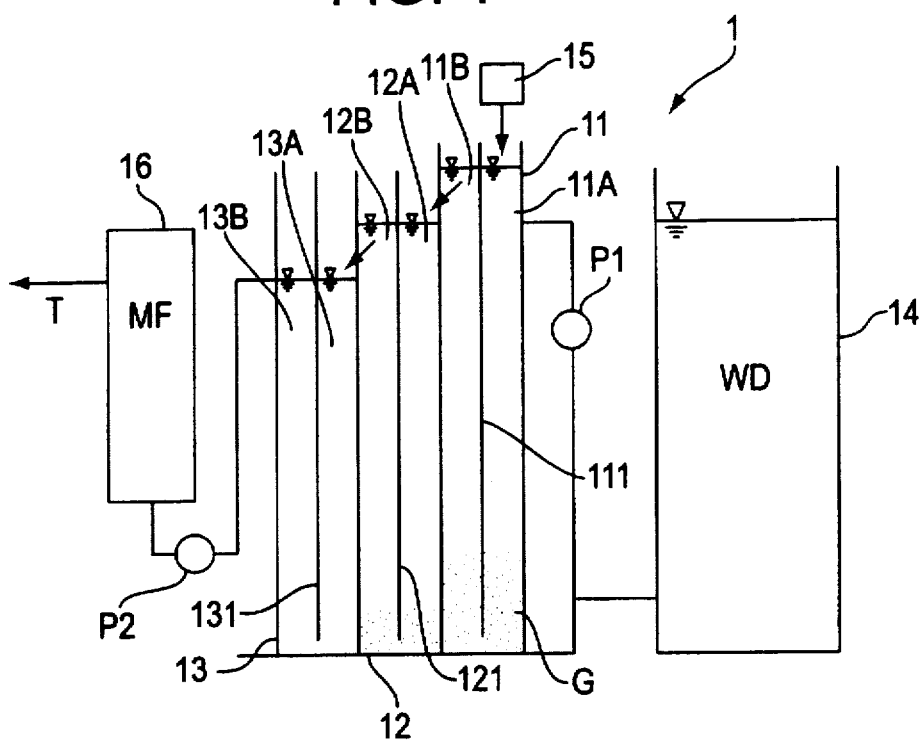
FIG. 1 is a schematic diagram showing one structural example of a silver removing device of the present invention.

In the present invention, a polymer precipitate is placed in a lower portion of a tank having a U-shaped treating space. Thus, the U-shaped treating space in the tank comprises (i) a first partition, (ii) a second partition and (iii) an interconnecting partition for interconnecting the first partition and the second partition in the lower portion of a tank. The polymer precipitate divides the U-shaped treating space to form two spaces (corresponding to the first and second partitions). Next, a photographic processing waste solution is introduced from one (the first partition) of the two spaces. Then, the photographic processing waste solution is treated in the presence of a polymer having a S atom which can coordinate with a metal. The polymer precipitate present in the processing waste solution itself is considered to play a seed crystal role to promote coordination of the metal (particularly silver) in the solution with the polymer having the S atom which can coordinates with the metal (hereinafter also referred to as the "S-containing polymer"), which makes it easy to form a precipitate in which the metal coordinates. Accordingly, formation of the precipitate in which the metal coordinates is promoted. As a result, the metal (particularly silver) can be surely removed from the liquid.

For this reason, the concentration of the metal (particularly silver) in the solution in the other space opposite to one space on the solution introduction side of the U-shaped treating space is extremely decreased. Further, microfiltration (MF) or ultrafiltration (UF) is appropriately conducted to the solution thus treated, whereby the separation and removal of the metal (particularly silver) contained in the solution can be further ensured. It therefore becomes possible to satisfy the discharge standard even in a region in which the discharge level of silver is rigorous.

For example, in the silver removal according to an ion-exchange resin previously known, even if at least two columns are connected in series, the silver content is only reduced from 25 ppm to a level of 1 to 10 ppm at most. Further, according to a method for removing silver by electrolysis in which carbon is packed between an anode and a cathode and a diaphragm is used for partition so that carbon is not connected to the cathode, even if three units are connected in series to conduct treatment, a level of 2 to 10 ppm is only obtained.

According to the method of present invention, however, 0.1 to 1 ppm can be achieved at a stroke by passing through this U-shaped tank, and a level of Ag ≈0.001–0.05 ppm can be surely achieved by further installing an MF membrane. When a UF membrane is used in place of the MF membrane, a level of Ag ≈0.01–1 ppm can be achieved. Namely, according to the process of the present invention, the significant silver removal level can be achieved, compared with the case in which a large-scaled ion-exchange tower or high three-dimensional electrolysis equipment is used.

Further, a method has previously been known in which $Na_2S$ is added as a silver precipitating agent. However, this method gives out a very bad smell in the treatment environment, and forms the very fine precipitate of $Ag_2S$, which passes through an MF membrane. This can be surely separated by a UF membrane, but causes clogging of the UF membrane. It is therefore practically impossible to use it.

Further, according to the literature, trimercapto-s-triazine (TMT) is known similarly as the silver precipitating agent. However, problems similar to those of $Na_2S$ are encountered in that it has a bad smell, in that heating is required for precipitate formation and it takes time for precipitate formation, and in that the precipitate is fine.

This compound (TMT) was attempted in color laboratories in some cases because the smell thereof is not so bad as that of $Na_2S$. However, the necessity of heating in precipitating results in expensive equipment cost, and the time-consuming precipitate formation results in tremendously large precipitation tanks, which causes high initial cost. This is therefore unprofitable.

Further, low molecular weight silver precipitating agents similar to $Na_2S$ and trimercapto-s-triazine are known (dithiocarbamic acid derivatives of JP-A-51-111756; diphenylthiocarbazone of JP-A-59-9857; and aminoalkylthiols of JP-W-5-506727 (the term "JP-W" as used herein means an unexamined published international patent application)). However, these have similar drawbacks, so that they are not put to practical use.

In the silver removing devices equipped with the tanks and filtration treating means for MF or UF as described above in the present invention, continuous treatment becomes possible, and the treatment efficiency is improved. Further, they require smaller spaces for installation.

Furthermore, in the photographic processing apparatuses equipped with such silver removing devices, if discharge liquids having fixing ability of the processing tanks and the washing tanks are treated by the silver removing devices, liquids after silver removal can be returned to the respective processing tanks to reuse them. The photographic processing waste solution in the present invention means a processing liquid after use, and shall contain the discharge liquid as described above.

The concrete constitution of the present invention is described below in detail.

An object of a process for treating a photographic processing waste solution of the present invention is to remove silver from the photographic processing waste solution, and one structural example of a silver removing device of the present invention for carrying out such a treating process is shown in FIG. 1.

As shown in FIG. 1, a silver removing device 1 comprises tanks 11, 12 and 13 (hereinafter referred to as "precipitation tanks") having U-shaped treating spaces. The U-shaped treating spaces of these precipitation tanks 11, 12 and 13 are formed by dividing the insides of the tanks into two parts with dividing plates 111, 121 and 131, respectively. The dividing plates 111, 121 and 131 in this case are installed so as not to reach bottom surfaces of the tanks. A polymer precipitate G is placed in lower portions of the precipitation tanks 11 and 12. This polymer precipitate G is preferably a colloidal precipitate, which exists in the state that it floats in an aqueous dispersing medium.

In the precipitation tank 11, treating spaces 11A (corresponding to the above first partition) and 11B (corresponding to the above second partition) are formed bordering on the polymer precipitate G. The polymer precipitate G is to form an interconnecting partition in a lower portion of the tank. Similarly, treating spaces 12A and 12B are formed in the precipitation tank 12. In the precipitation tank 13, treating spaces 13A and 13B are formed in the form that the tank is approximately divided into two parts with the dividing plate 131.

The silver removing device 1 is equipped with a liquid feed pump P1 for introducing, for example, a washing waste solution WD as the photographic processing waste solution from a stock tank 14 into the treating space 11A of the precipitation tank 11.

Further, the silver removing device 1 is equipped with a tank 15 containing an aqueous solution of an S-containing polymer so that the aqueous solution of the S-containing polymer is supplied from the tank 15 to the treating space 11A of the precipitation tank 11.

The washing waste solution WD supplied from the stock tank 14 is treated in the treating spaces 11A and 11B of the precipitation tank 11, successively, and flows from the treating space 11B into the treating space 12A of the precipitation tank 12 by overflowing. The washing waste solution WD thus flowing into the treating space 12A is treated in the treating spaces 12A and 12B, successively, and flows from the treating space 12B into the treating space 13A of the precipitation tank 13 by overflowing.

The washing waste solution WD thus flowing into the treating space 13A is treated in the treating spaces 13A and 13B, successively. The washing waste solution WD in the treating space 13B is introduced into an MF unit 16 by a liquid feed pump P2, and treatment with a microfiltration membrane (MF membrane) is conducted herein. Then, a permeated liquid T is obtained by the treatment with the microfiltration membrane.

The treatment as described above reduces the silver content of the washing waste solution WD at the stage of the permeated liquid T to 0.01 ppm or less, whereas the silver content of the washing waste solution WD in the stock tank 14 is 20 to 120 ppm.

The reason why the silver removal proceeds rapidly like this is considered to be that the polymer precipitate G placed in the lower portions of the precipitation tanks 11 and 12 plays a seed crystal role as described above to promote precipitate formation of the s-containing polymer with which Ag coordinates. The amount of the liquid introduced from the stock tank 14 into the treating space 11A of the precipitation tank 11 in this case is preferably about 70 to 120 ml/minute when the precipitation tank with a tank capacity of about 20 liters is used. Further, when the MF membrane is used and fully coated with the S-containing polymer precipitate, the liquid can also be treated in an amount of 70 ml/minute to 2000 ml/minute. When an ultrafiltration membrane (UF membrane) is used in place of the MF membrane, the amount is preferably 70 ml/minute to 200 ml/minute.

In the example shown in the drawing, a two-step cascade system using two precipitation tanks (the total tank capacity is 40 liters) is employed. However, when five-step cascade system (the total tank capacity is 100 liters) is used, the amount is preferably 400 ml/minute to 2 liters/minute. Further, when the MF membrane is fully coated with the S-containing polymer precipitate, the amount is preferably 500 ml/minute to 5 liters/minute. Furthermore, the feed amount of an aqueous solution of the S-containing polymer is preferably an amount corresponding to 1.5 mol of the S-containing polymer based on the average silver content of the washing waste solution WD. When the silver content of the washing waste solution WD is 25 ppm, the feed amount is preferably a level of $1/2000$ to $1/50000$ the amount of this liquid introduced. By adjusting the amount of the solution introduced like this, the precipitate is formed in the treating space 11A after an elapse of about 5 to 40 minutes. If the amount of the solution introduced is increased, the sedimentation of the precipitate formed does not overtake the flow rate of the solution. If the amount of the solution, namely the S-containing polymer, introduced is decreased, the formation of the precipitate becomes difficult.

The silver content reaches a level of $1/5$ to $1/50$ at the stage in which the liquid is introduced into the treating space 11A. Further, it reaches a level od $1/50$ to $1/500$ in the treating space 11B. Like this, most silver contained in the washing waste solution WD is removed at the stage in the precipitation tank 11, and silver is further removed in the precipitation tank 12 by action similar to that in the precipitation tank 11. Although no polymer precipitate G exists in the precipitation tank 13, the coordination rate of silver to the S-containing polymer is sometimes increased to form a precipitate.

Thus, the silver content of the liquid at the stage before introduction into the MF unit 16 reaches a level of 0.1 to 1 ppm.

The amount of the polymer precipitate G should be adjusted, in the precipitation tank 11, to a capacity of $1/20$ to $1/2$ the tank capacity thereof, and in the precipitation tank 12, to a capacity of $1/50$ to $1/10$ the tank capacity thereof. The arrangement of the polymer precipitate G with such a capacity makes it easy to form the precipitate. In contrast, if the amount of the polymer precipitate G is decreased, the rapid formation of the precipitate can not be expected. If the amount is too much, it unpractically becomes difficult to ensure the treating space. Accordingly, when the precipitate in which silver coordinates is formed to increase the amount of the whole precipitate too much, it should be appropriately removed from the lower portion of the precipitation tank.

When the above-described level of silver removal is considered from the viewpoint of silver removal, only one precipitation tank is considered to be sufficient. However, in terms of prolonged membrane life of the MF membrane, it is preferred that a plurality of precipitation tanks (about 2 to 7 tanks in total) are provided as shown in the drawing.

The amount of the solution introduced from the treating space 13B of the precipitation tank 13 into the MF unit through the pump P2 may be identical to the amount of the waste solution introduced.

The permeated water T obtained above has a very low silver content, so that it can be discharged into rivers or sewerages as such even in a region in which the discharge standard of silver is rigorous. In addition to this, the water can also be partly returned to a middle-stage tank (except for the final-stage tank) of washing tanks of a multistage countercurrent system to reuse it.

Although the MF is used as a filtration treating means in FIG. 1, not only the MF, but also the UF may be used. Further, the MF and the UF may be used in combination.

When the UF membrane is used in place of the MF membrane, a 100- to 1000-fold excess in relation to the amount of the waste solution introduced, for example, 40 liters/minute, is introduced, and a return liquid is returned to the tank 13A, because the permeated liquid T flows out in an amount of 1/100 to 1/1000 the amount of the return liquid thereby.

Figure 2:
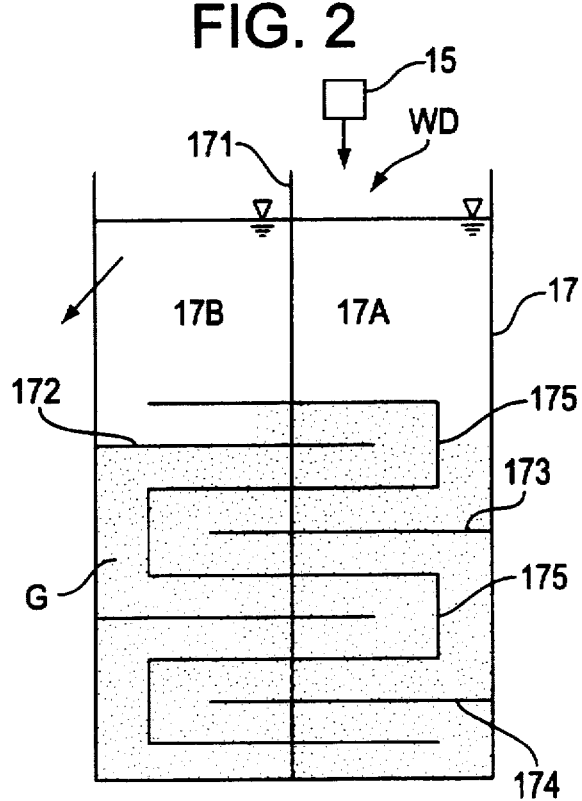
FIG. 2 is a schematic diagram showing another structural example of a precipitation tank.

The precipitation tank in the present invention is not limited to one shown in FIG. 1, but may be one shown in FIG. 2. Thus, in the present specification, "U-shaped treating space" means a treating space which substantially has a U-shape wherein a liquid level in a tank partitions the treating space to form the entrance and exit thereof, and an interconnecting partition is present in a lower portion of the tank.

In a precipitation tank 17 of FIG. 2, the inside of the tank is divided into two parts by a dividing plate 171 to form treating spaces 17A (corresponding to the above first partition) and 17B (corresponding to the above second partition), and a polymer precipitate G is placed in a lower portion similarly to one shown in FIG. 1. The polymer precipitate G is to form an interconnecting partition in a lower portion of the tank. However, this lower space is provided with dividing plates 172, 173 and 174 and a dividing member 175 so that the washing waste solution WD introduced from the treating space 17A is transferred to the treating space 17B in a zigzag line in the lower space. The dividing plates 172, 173 and 174 are alternately mounted from the right and left sides of a tank wall so as to be directed perpendicularly to the dividing plate 171 as shown in the drawing. The dividing member 175 is attached to a lower portion of the dividing plate 171 as shown in the drawing, and divides a space formed by the dividing plates 172, 173 and 174, the tank wall, etc. into approximately two parts. The other structure is similar to that of FIG. 1.

Figure 3:
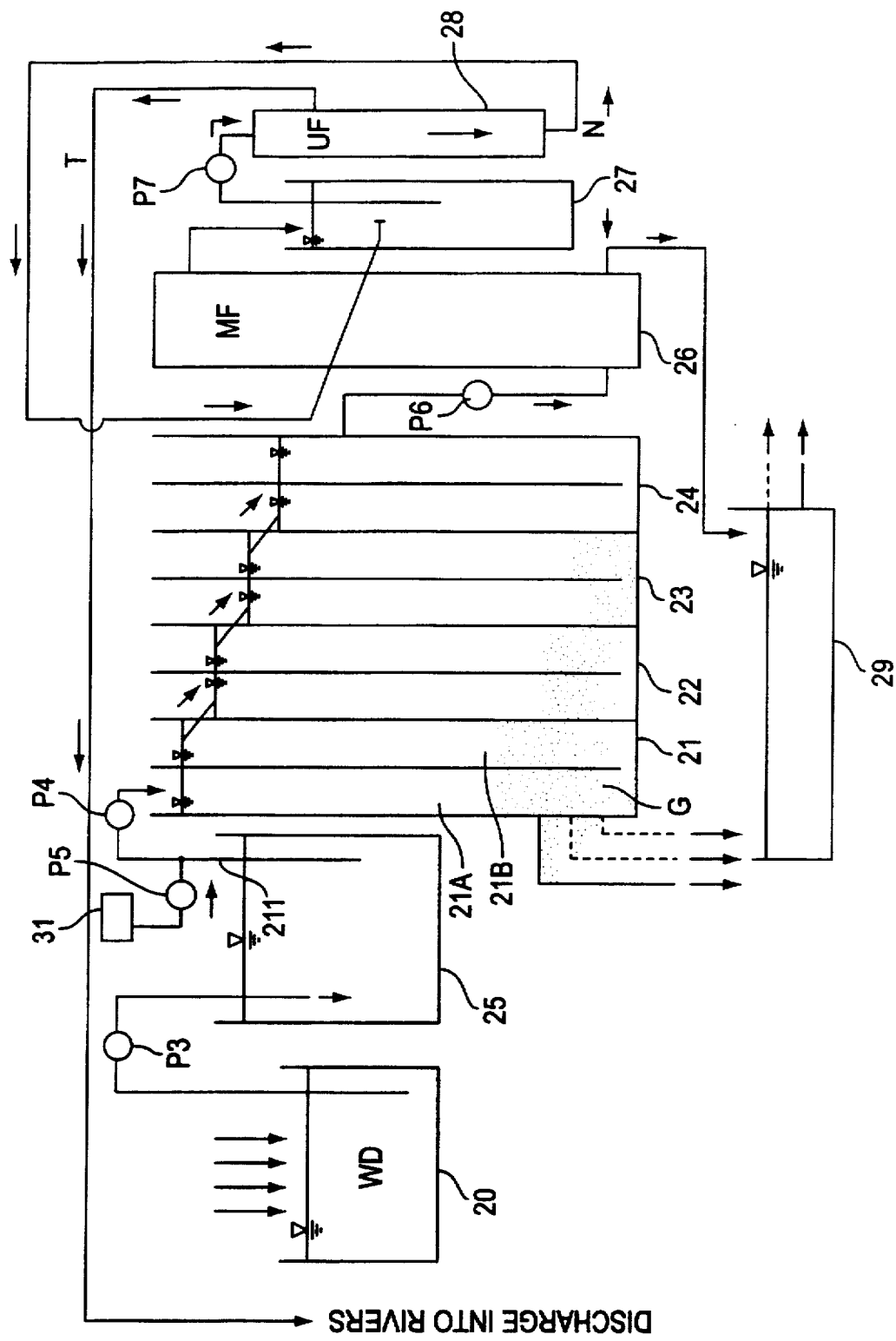
FIG. 3 is a schematic diagram showing a waste solution treating system to which a silver removing device of the present invention is applied.

The case that the silver removing device as shown in FIG. 1 is actually applied to a treating system of a photographic processing waste solution is described below. In FIG. 3, one structural example of a treating system of a photographic processing waste solution mainly comprising a washing waste solution is shown.

Figure 7:
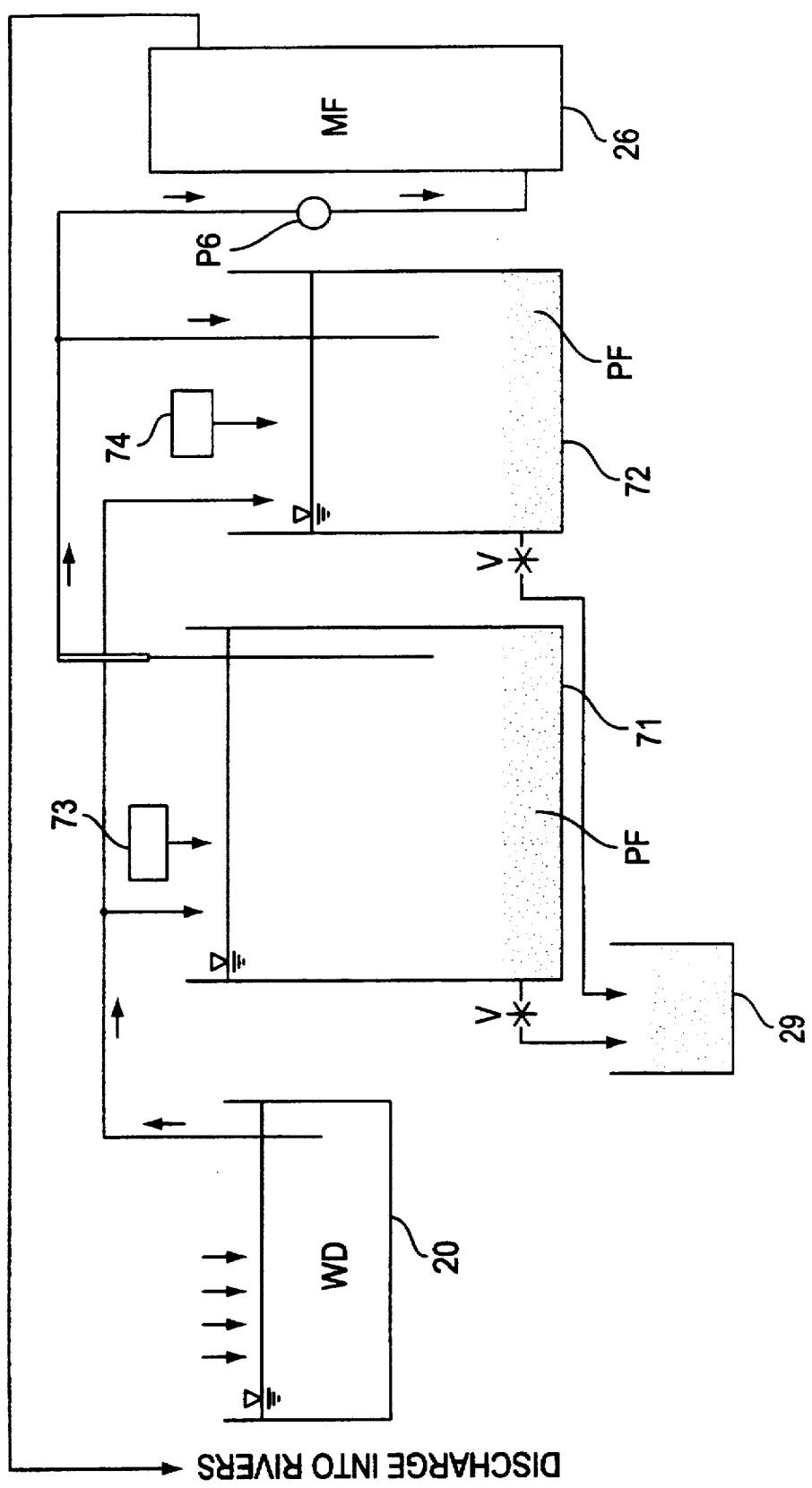
FIG. 7 is a schematic diagram showing a waste solution treating system to which a silver removing device for comparison is applied.

Before explaining the structure of FIG. 3, alternate operation using two precipitation tanks is shown in FIG. 7 for comparison.

This comprises a storage tank 20 for storing a washing waste solution WD discharged from each processor, etc., two precipitation tanks 71 and 72, an MF unit 26 and a sludge recovery tank 29. Further, tanks 73 and 74 containing an S-containing polymer solution are arranged, and the S-containing polymer solution is supplied from these tanks 73 and 74 to the precipitation tanks 71 and 72, respectively, as shown in the drawing.

In FIG. 7, a precipitation phase PF exists in lower portions of the insides of the precipitation tanks 71 and 72. The washing waste solution WD is added, and the S-containing polymer is further added, followed by stirring for 1 to 2 minutes, whereby the lower precipitate PF is mixed with the waste solution newly added to accelerate the precipitate formation. After standing for 30 minutes, a supernatant from which the lower phase precipitate is removed is sent out to the MF unit 26 through a liquid feed pump as shown in FIG. 7. Thus, an MF membrane of the MF unit can be prevented from clogging, and the effect is given that the precipitate formation is promoted by the precipitation phase PF in the lower portions of the precipitation tanks 71 and 72. When the precipitation phase PF is increased, lower valves V are opened to partly remove them. According to this method, however, the silver removal level is about 0.1 to 0.3 ppm, but this method is batch treatment and requires a large-scaled precipitation tank. The time and the space are therefore required.

Figure 8:
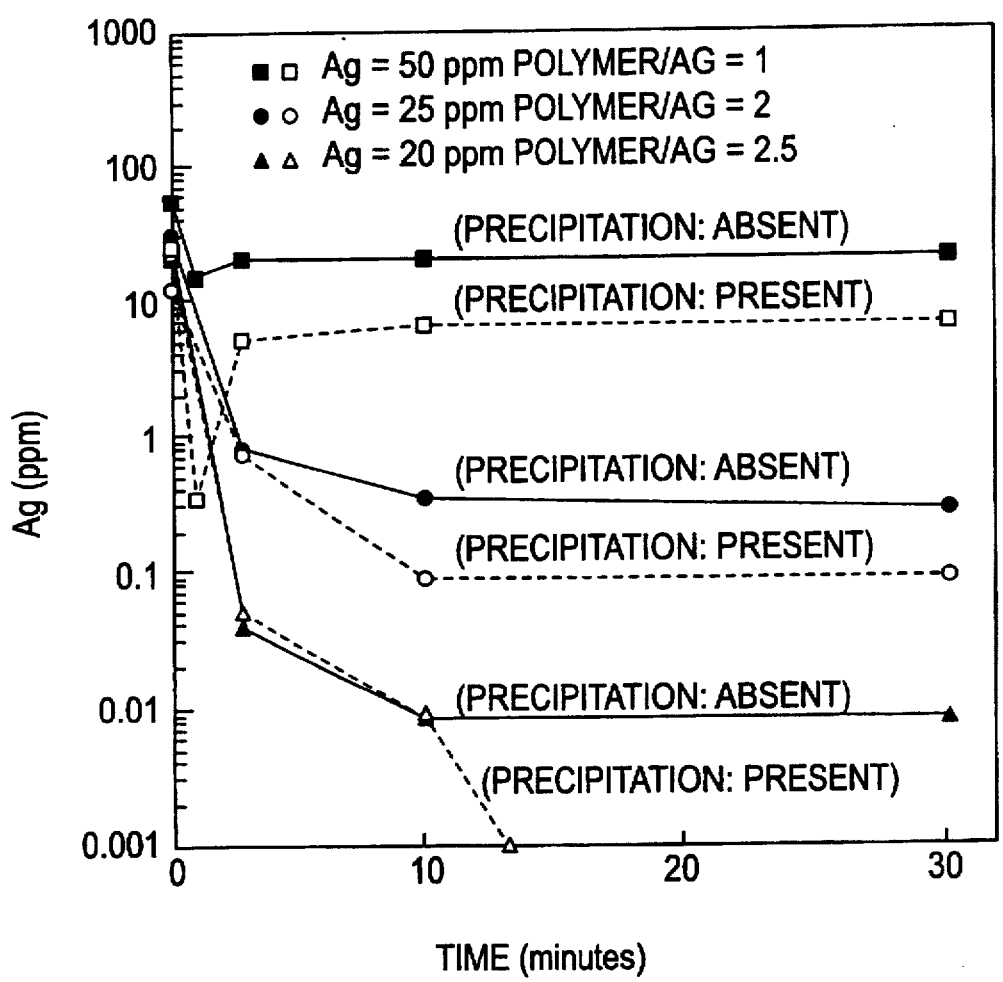
FIG. 8 is a graph showing changes with time in Ag concentration for the presence or absence of a precipitation phase.

For the case that the precipitation tanks of FIG. 7 are used, the silver removal effect depending on the presence or absence of the precipitation phase is examined. As a result, the silver removal effect according to the precipitation phase significantly appears as shown in FIG. 8. FIG. 8 is a graph showing aging changes in Ag concentration of the supernatants obtained when the silver content of the waste solution is changed to 50 ppm, 25 ppm and 20 ppm and Epofloc L-2 described later is used as the S-containing polymer under the conditions shown in the drawing. This graph shows that the precipitate formation is promoted by the precipitation phase to reduce the Ag concentration of the supernatants, and that this effect is remarkable when the Ag concentration is high.

A system is shown in FIG. 3, in which the improvement of the above-described treatment efficiency is tried based on such an effect according to the precipitate phase. FIG. 3 is described below.

As shown in FIG. 3, a storage tank 20 for storing a washing waste solution WD discharged from each processor is installed in this treating system. The washing waste solution WD is introduced from this storage tank 20 into a stock tank 25 through a liquid feed pump P3. The washing waste solution WD is further introduced from this stock tank 25 into a treating space 21A of a precipitation tank 21 through a liquid feed pump P4. Prior to this introduction, a S-containing polymer solution is introduced from a tank 31 into a liquid feed pipe 211, and the washing waste solution WD is mixed with the S-containing polymer solution in the liquid feed pipe 211, as shown in the drawing.

Precipitation tanks 21, 22 and 23 installed in this system have the same structure as with the precipitation tanks 11 and 12 of FIG. 1, and a polymer precipitate G is placed in lower portions thereof.

The amount of the polymer precipitate G in these three precipitation tanks 21 to 23 is gradually decreased. Further, a precipitation tank 24 has the same structure as with the precipitation tank 31 of FIG. 1. In these precipitation tanks 21 to 24, the washing waste solution WD is in turn transferred in a manner similar to that of FIG. 1, and silver contained in the washing waste solution WD coordinates with the S-containing polymer to form a precipitate, thereby removing silver from the washing waste solution WD. Then, the liquid is introduced from the precipitation tank 24 into an MF unit 26 through a liquid feed pump P6, and subjected to filtration according to an MF membrane.

The permeated liquid in this case is introduced int a buffer tank 27, further introduced from the buffer tank 27 into an UF unit 28 through a liquid feed pump P7, and subjected to treatment according to a UF membrane. On the other hand, a precipitate which has adhered to the MF membrane is recovered in a sludge recovery tank 29. A supernatant may be removed here to appropriately recover sludge. Further, also when precipitates are formed in the precipitation tanks 21, 22 and 23 to increase the amount of the whole precipitate, the precipitate is appropriately partly recovered in the sludge recovery tank 29. The permeated liquid T obtained by treatment according to the UF membrane as described above does not contain silver, so that it can be discharged into rivers or sewerages particularly in Europe and U.S.A. In addition, it can be returned to a washing tank to reuse it in a manner similar to that described above.

On the other hand, a concentrated liquid N obtained by a treatment through the UF membrane is returned to the buffer tank 27, and the treatment through the UF membrane is conducted thereto again. In some cases, it may be partly returned to the precipitation tank 24.

When the silver content of the washing waste solution WD with which the stock tank 25 is first filled is 30 to 50 ppm, the silver content of the permeated liquid T obtained by treatment through the UF membrane is 0.01 ppm or less, and that of the concentrated liquid N is reduced to a level of 0.03 ppm or less.

Figure 4:
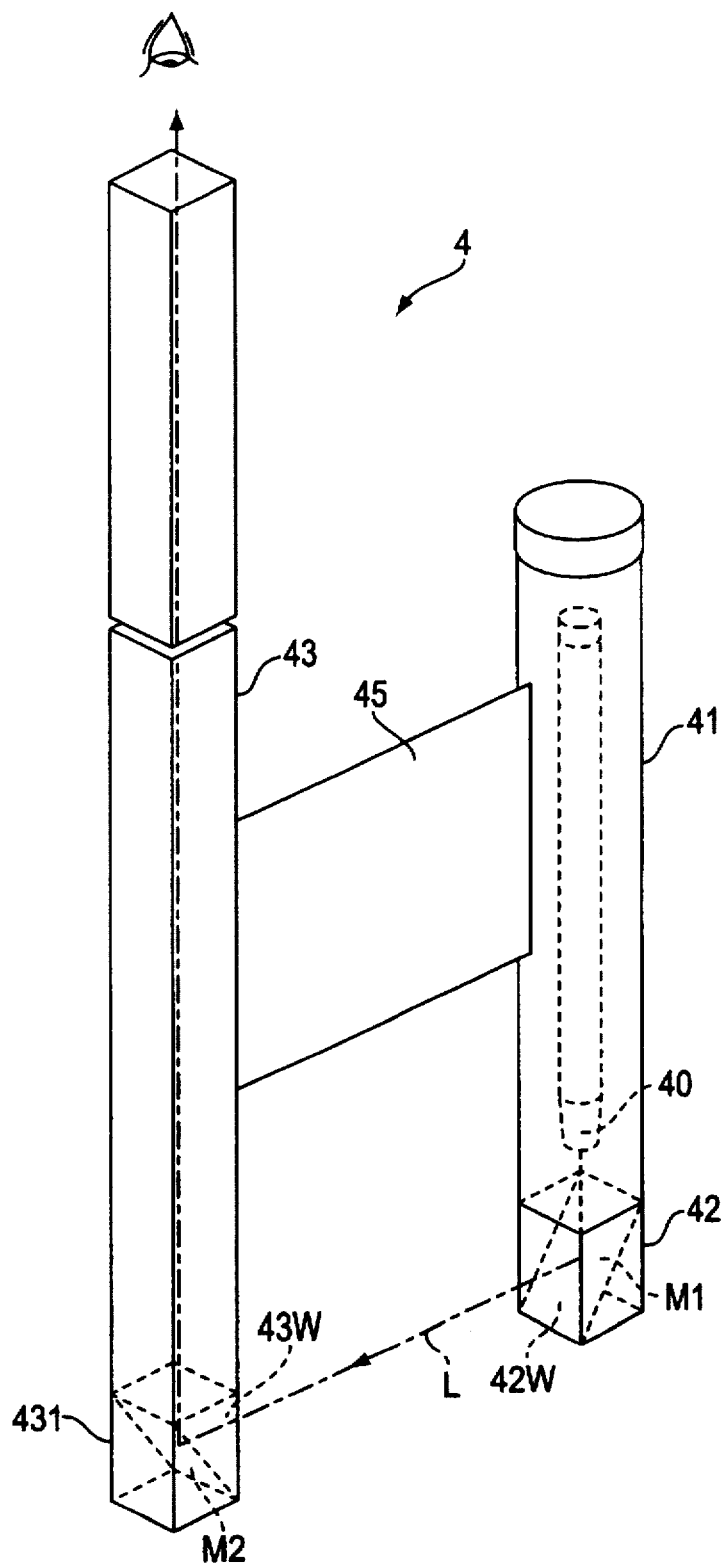
FIG. 4 is a schematic diagram showing a detector for detecting a precipitate.

In order to confirm the formation of the precipitate in which silver coordinates in the precipitation tanks 21 to 23, a detector as shown in FIG. 4 may be used.

The detector of FIG. 4 comprises a cylindrical member 41 containing a flashlight 40, and a cubic member 42 attached to a leading edge portion of the cylindrical member 41. A mirror M1 for receiving light of the flashlight 40 and reflecting this light is arranged in the cubic member 42. Further, the cylindrical member 41 is connected to a square pillar member 43 through an arm 45. A mirror M2 is arranged at a leading edge portion 431 of the square pillar member 43 opposite to the cubic member 42. Further, transparent windows 42W and 43W are formed at side faces of the cubic member 42 and the leading edge portion 431, respectively, which face to each other. The mirror M2 in the leading edge portion 431 receives the light L reflected from the mirror M1 of the cubic member 42, and the light reflected by the mirror M2 can be detected from an upper portion of the square pillar member 43 as shown in the drawing.

The length of the square pillar member 43 is set depending upon the depth of the precipitation tank. If the precipitate exists between the cubic member 42 and the leading edge portion 431, the light from the transparent window 42W of the cubic member 42 is scattered or intercepted by the precipitate. The light is therefore weakened or can not be received at all when observed from above the square pillar member 43, compared with the case that the solution exists.

Accordingly, the detector 4 is immersed in the precipitation tank to a specified depth, and the precipitate in the precipitation tank is recovered when the light becomes unreceived.

A photographic processor equipped with the silver removing device as shown in FIG. 1 is illustrate d below.

Figure 5:
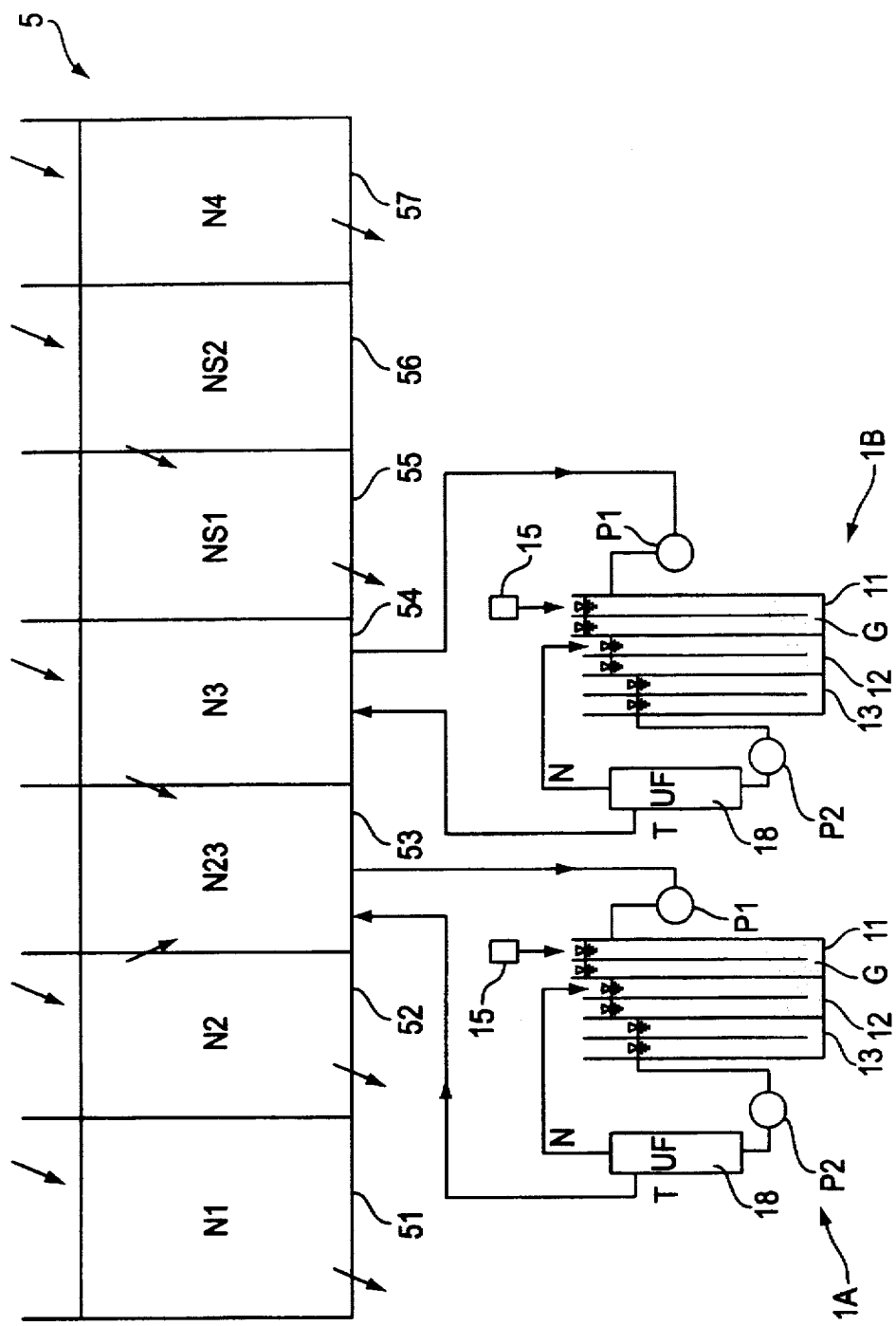
FIG. 5 is a schematic diagram showing a photographic processor equipped with a silver removing device of the present invention.

In FIG. 5, one structural example of a photographic processor for processing a color negative film is shown. The photographic processor 5 of FIG. 5 comprises a color developing tank 51 filled with a color developing solution N1, a bleaching tank 52 filled with a bleaching solution N2, a bleaching-fixing tank 53 filled with a bleaching-fixing solution N23, a fixing tank 54 filled with a fixing solution N3, a first washing tank 55 filled with washing water NS1, a second washing tank 56 filled with washing water NS2 and a stabilizing tank 57 filled with a stabilizing solution N4, and the processing of color development→bleaching→bleaching→fixing→fixing→first washing→second washing→stabilization is conducted to the color negative film.

The bleaching tank 52 and the fixing tank 54 are replenished with respective replenishers, respectively, and respective overflows from the bleaching tank 52 and the fixing tank 54 are introduced into the bleaching-fixing tank 53, thereby performing replenishment.

Further, in the first washing tank 55 and the second washing tank 56, a multistage countercurrent system is employed in which the second washing tank 56 is replenished and an overflow thereof flows into the first washing tank 55.

Furthermore, the color developing tank 51 and the stabilizing tank 57 are also replenished and overflowed.

In FIG. 5, the bleaching-fixing tank 53 and the fixing tank 54 are equipped with silver removing devices 1A and 1B, respectively, which have the same structure as with FIG. 1, with the proviso that these silver removing devices 1A and 1B are provided with UF units 18 in place of the MF devices of FIG. 1. A discharge liquid taken out of the bleaching-fixing tank 53 by overflowing or forcedly is introduced into the silver removing device 1A, and silver is removed from the discharge liquid similarly to FIG. 1. A permeated liquid T obtained by a treatment through the UF membrane is returned to the bleaching-fixing tank 53 to reuse it. On the other hand, a concentrated liquid N is returned to a middle-stage precipitation tank 12. Further, when the amount of the whole precipitate is increased too much, they are appropriately recovered from lower portions of precipitation tanks 11 to 13.

At this time, even if the permeated liquid is returned to the bleaching-fixing tank 53 as such without using the UF membrane, it can be sufficiently used. This is because the S-containing polymer does not affect the photographic properties. If it affects the photographic properties, the UF is equipped, whereby the S-containing polymer can be removed by the UF membrane.

In the permeated liquid T described above, fixing ability is restored because of silver removal. The liquid restored in fixing ability is returned to the bleaching-fixing tank 53, so that the replenishment rate can be reduced. Further, when an Fe (III) complex salt is used as a bleaching agent, Fe(II), etc. generated by bleaching treatment also coordinate with the S-containing polymer and are removed.

Furthermore, a discharge liquid taken out of the fixing tank 54 by overflowing or forcedly is introduced into the silver removing device 1B, and silver is removed from the discharge liquid similarly to FIG. 1. A permeated liquid T obtained by treatment through the UF membrane is returned to the fixing tank 54 to reuse it. A concentrated liquid N and a precipitate obtained by treatment according to the UF membrane are treated in the same manner as with the silver removing device 1A.

Also in the permeated liquid T in this case, fixing ability is restored because of silver removal. Accordingly, the replenishment rate of the fixing solution can be reduced.

The silver and iron content is thus reduced in the bleaching-fixing tank 53 and the fixing tank 54. As a result, the amounts of silver and iron introduced into the washing water NS1, NS2 and the stabilizing solution N4 are remarkably decreased, which makes it possible to reduce the replenishment rates of the washing water and the stabilizing solution. Further, waste solution treatment of the washing waste solution becomes easy. Furthermore, the color image stability is improved.

In FIG. 5, the subject to be processed is the color negative film, but it is not limited to this photographic material. Further, a similar effect can be obtained by providing such a silver removing device on a processing tank not only in the processing stage of bleaching→bleaching→fixing→fixing as described above, but also in each processing stage such as bleaching→fixing, bleaching→fixing, fixing→bleaching→fixing or bleaching→bleaching-fixing.

A hardening type fixing agent exists in a black-and-white fixing solution, and at this time, sulfate band (aluminum sulfate) is contained. In this case, aluminum is also partly removed by the S-containing polymer, and it may be therefore used in the fixing solution. However, it is rather preferred to use in washing waste solution treatment after fixing solution treatment.

As described above, it becomes possible to reuse the processing solution having fixing ability. As a result, the replenishment rate of the processing solution having fixing ability can be reduced by 50 to 90% in all, compared with the case that such reuse is impossible.

Figure 6:
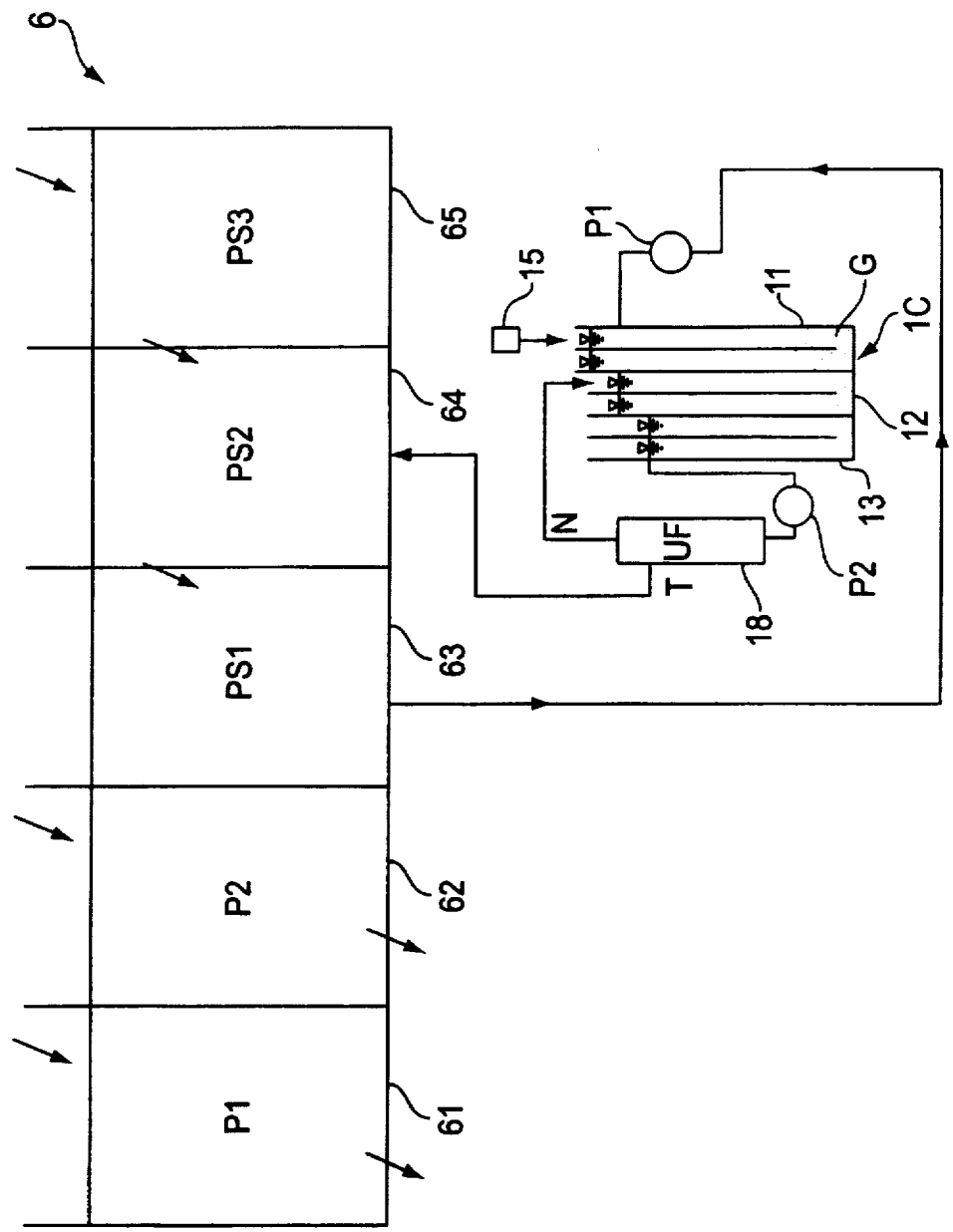
FIG. 6 is a schematic diagram showing a photographic processor equipped with a silver removing device of the present invention.

In FIG. 6, one structural example of a photographic processor for processing color paper is shown. The photographic processor 6 of FIG. 6 comprises a color developing tank 61 filled with a color developing solution P1, a bleaching-fixing tank 62 filled with a bleaching-fixing solution P2, a first washing tank 63 filled with washing water PS1, a second washing tank 64 filled with washing water PS2 and a third washing tank 65 filled with washing water PS3, and the processing of color development→bleaching-fixing→first washing→second washing→third fixing is conducted to the color paper.

In each tank of the color developing tank 61 and the bleaching-fixing tank 62, a replenishing system is employed, and in the first to third washing tanks, a multistage countercurrent system is employed in which the third washing tank is replenished and the replenisher is introduced into the second and first washing tanks in turn.

In FIG. 6, the first washing tank 63 is equipped with a silver removing device 1C having the same structure as with FIG. 1, with the proviso that the silver removing device 1C is provided with UF unit similarly to one shown in FIG. 5. A discharge liquid taken out of the first washing tank 63 by overflowing or forcedly is introduced into the silver removing device 1C, and silver is removed from the discharge liquid similarly to FIG. 1. A permeated liquid T obtained by a treatment through the UF membrane is returned to the second washing tank 64 to reuse it. A concentrated liquid N and a precipitate obtained by treatment according to the UF membrane are treated in the same manner as with the silver removing device 1A of FIG. 5.

When the permeated liquid T is returned to reuse it, it is preferred to return it to a middle-stage tank, not to the final-stage tank. The reason for this is that the final-stage tank is preferably replenished with a fresh replenisher to obtain good photographic properties.

As to the permeated liquid T described above, iron brought into the washing water, in addition to silver, is also removed, so that the color image keeping quality is improved. Further, dyes and surfactants are also removed. This is preferable for reuse, and can reduce the replenishment rate of the washing water. Furthermore, bacteria and duckweeds are also removed by precipitation in the precipitation tank. In addition, offensive odors caused by decomposition of $SO_3^{2-}$ or $S_2O_3^{2-}$, or by bacteria can be prevented.

Also in this case, the UF membrane may be omitted if necessary. Further, the MF membrane or an ordinary filter (1 µm, 5 µm or 25 µm) may be used in place of the UF membrane. This is also the same in FIG. 5.

In the above, the subject to be processed is the color paper, but it is not limited to this photographic material. The above-described structure can be applied to any as long as the washing tanks of the multistage countercurrent system are used in processing. Further, to a washing tank in which a plurality of processing chambers are connected by narrow passages as disclosed in JP-A-2-205846, the present invention can be applied as a structure in which one having 3 or more processing chambers is used, such a system that the liquid is allowed to flow in from a later-stage processing chamber in turn is employed, a previous-stage processing chamber is equipped with a silver removing device, and a permeated liquid T is returned to a middle-stage processing chamber.

As described above, it becomes possible to reuse the washing water. As a result, the replenishment rate of the washing water can be reduced by 30 to 80%, compared with the case that such reuse is impossible.

In the present invention, the polymer precipitate placed in the lower portion of the precipitation tank is preferably a colloidal precipitate, and it is preferred to use an insolubilized or hydrophobic polymer dispersed in an aqueous dispersing medium. The specific gravity of such a dispersing system is preferably higher than that of water, 1.01 or more, and more preferably 1.02 or more. Although there is no particular restriction on the upper limit of the specific gravity at this time, it is usually about 1.6.

Such polymer precipitates first include ones obtained by insolubilizing water-soluble metal-adsorptive polymers. Insolubilization is carried out by coordination of metals or polymerization by bonding of polymers to each other.

The metal-adsorptive polymers in this case are preferably ones containing S-containing groups (such as thiol groups or derivatives thereof, thioether groups, thiocarbamic acid groups or derivatives thereof, dithiocarbamic acid groups or derivatives thereof, thiocarboxylic acid groups or derivatives thereof, and dithiocarboxylic acid groups or derivatives thereof). The above derivatives thereof include salts (e.g., sodium salt) of these groups.

Preferred examples of the S-containing groups include thiocarbamic acid groups, dithiocarbamic acid groups and thiocarboxylic acid groups, more preferably dithiocarbamic acid groups.

As the polymers containing S-containing groups, preferred are those having a water-soluble linear structure, which do not have a network structure. More specifically, preferred are straight-chain polymers in a part of which water-soluble substituents have been introduced, whereby the polymers are water-soluble before reacting with a metal ion.

Examples thereof include polythioglycol, polyvinylbenzenesulfonic acid, polydivinylbenzenesulfonic acid and polymers (given later) used as the S-containing polymers in the present invention. They may be polymers having structure units indicated by the following formulas:

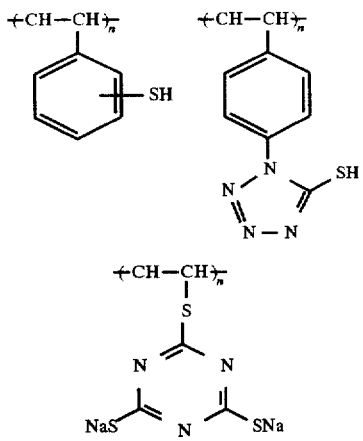

wherein n is 1 to 200,000, preferably 1,000 to 80,000, more preferably 1,000 to 20,000.

The metals used for insolubilization are preferably heavy metals such as platinum, gold, silver and copper from the viewpoint of specific gravity for the purpose of precipitation. Accordingly, Ag(I), Cu(II), etc. are preferred, and particularly Ag(I) is preferably used. In the present invention, the primary object is to recover silver. It is therefore preferred that another metal is not contained when the precipitate is recovered as described above.

When polymerized, S—S bonds of polymers can be formed by electrolysis treatment to achieve insolubilization.

The number average molecular weight of such insolubilized products of the metal-adsorptive polymers is about 10,000 to 2,000,000.

Further, as the polymer precipitates, polymer latexes containing hydrophobic polymers (for example, polyacrylates and polymethacrylates) which are allowed to carry mercapto compounds may be used.

Furthermore, in the present invention, inorganic fine particles such as zeolite, acid white clay and stones and rocks of igneous rock may be used in combination with the above-described polymer precipitates.

In the present invention, it is preferred to use the insolubilized products of the S-containing polymers which are used when the metals (particularly silver) are allowed to coordinate to form the precipitates among others as the polymer precipitates. In particular, the primary object is to recover silver, so that the method in which silver is allowed to coordinate is preferably employed for insolubilization, and this may be used in combination with the insolubilizing method with the S—S bond formation of polymers by electrolysis. Thus, the originally existing polymer precipitates are adjusted so as to approximately agree with the generated precipitates, resulting in easy subsequent recovery operations.

The number average molecular weight of the insolubilized products of the silver-coordinated S-containing polymers thus preferably used as the polymer precipitates is about 15,000 to 1,500,000, and preferably about 75,000 to 450,000.

The S-containing polymers used in the present invention, namely polymers having S atoms which can coordinate with metals, are particularly preferably polymers each containing at least one coordination group of a thiol group or a derivative thereof (—SM), a thiocarbamic acid group or a derivative thereof (—NH—CO—SM), and a dithiocarbamic acid group or a derivative thereof (—NH—CS$_2$M) are preferred, and ones having the structures of the following formulas in molecular chains are preferred.

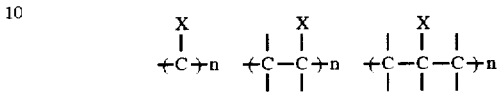

wherein X=—SM, —NHCOSM, —NHCS$_2$M (M=Li, Na, K, H), 100≦n≦30,000, more preferably 300≦n≦10,000. Polymers each having a dithiocarbamic acid group or a derivative thereof are preferred among others because of no odor. Further, mixtures of them with ones each having a thiocarbamic acid group or a derivative thereof are also preferred.

An end group of each of the polymers indicated by the above formulas is a hydrogen atom, a methyl group, an ethyl group, an amino group or the like, and a group other than X bonding to the carbon atom is a hydrogen atom, a methyl group, an ethyl group, an amino group or the like.

Further, the number average molecular weight of the polymers is about 10,000 to 1,000,000.

It is preferred that such polymers are water-soluble, and use of the water-soluble polymers promotes the progress of reaction with metals in solutions and improves the efficiency of metal removing. The solubility of such polymers to water is preferably at least 1 g per 100 g of water, and more preferably 40 to 900 g per 100 g of water.

Some of such polymers are commercially available as liquid chelating resins. Examples thereof include ones having trade names such as Epofloc L-1, L-2 (manufactured by Miyoshi Oil & Fat Co., Ltd.), Santhiol NW (manufactured by Nakagawa Kagaku Souchi Co.) and Gospel M-9, M-10 (manufactured by Gospel Kakou Co.). Of these, Epofloc L-1 and L-2 are most preferred.

Further, when synthesized, they can synthesized according to known methods.

In the present invention, as described above, the object is to remove silver from the waste solutions of washing solutions such as the washing water and the stabilizing solutions, and used liquids of processing solutions having fixing ability such as the fixing solutions and the bleaching-fixing solutions (mainly, the discharge liquids from the processing tanks). Accordingly, the above-described S-containing polymers mainly capture silver. In addition to this, the metals which can be captured by application to the photographic processing waste solutions include iron derived from the bleaching solutions or the bleaching-fixing solutions, cerium derived from reducing processing solutions, aluminum derived from hardening fixing processing solutions and tin derived from reversal baths.

The amount of the S-containing polymer to be added is generally within the range of 0.5 to 20 per an equivalent of metal contained, preferably 0.5 to 10, more preferably 0.7 to 10, and particularly preferably 1 to 4, although it varies depending on the amount of a metal (particularly, silver) contained in the solution. If it is added in an increased or decreased amount, the precipitate formation becomes difficult.

The number average molecular weight of the silver-coordinated S-containing polymer is about 100,000 to 400,000, and about 0.1 to 0.7 g of silver is captured in 1 g of this polymer.

It is preferred that the S-containing polymers are added as aqueous solutions as described above, and the concentration at this time is about 1.5 to 80% by weight. The mixing ratio of the aqueous solution of the polymer to the photographic processing waste solution depends on the amount of metals contained in the photographic processing waste solution. However, the volume ratio of the aqueous solution of the polymer/the photographic processing waste solution is generally 1/10 to 1/100,000, and preferably 1/10 to 1/10,000.

As described above, preferably, the aqueous solution of the S-containing polymer is added to the photographic processing waste solution, followed by sufficient stirring. Stirring is vigorously carried out for about 1 to 30 minutes, with heating at about 30 to 60° C. if necessary. In this case, a temperature of about 60° C. requires a stirring time of shorter than 1 minute, for example, about 20 seconds.

The ultrafiltration membrane (UF membrane) used in the present invention is preferably 9,000 or more in the fractional molecular weight determined by the direct measuring method under an electron microscope, and more preferably 9,500 to 50,000. Further, the average pore size determined by the direct observing method under an electron microscope is preferably 0.01 to 0.8 µm and more preferably 0.03 to 0.5 µm, and the pore size distribution of pores having a size of 1 µm or more, usually 1 to 5 µm, to all pores is preferably 0.015% or less, more preferably 0.008 to 0.015% and usually 0.01%.

The above-described fractional molecular weight, average pore size and pore size distribution are determined by the direct measuring method under an electron microscope. First, the average pore size is determined in the following manner. Namely, the average pore size of the ultrafiltration membrane is determined by calculating the average pore size from the pore size and its frequency on a membrane surface in a field of vision under an electron microscope. Usually, pores having a pore size highest in frequency are found out, and the pore size thereof is measured. This is taken as an average pore size. Similarly, the pore size distribution is determined.

On the other hand, the fractional molecular weight is determined by finding a fractional average molecular weight from an average value of molecular weights showing an exclusion rate of about 90% through a membrane having a pore size determined in the manner described above. Specifically, it is found from a graph showing the relationship between the pore size and the fractional average molecular weight. For example, when the pore size is 50 to 100 nm, the fractional molecular weight is 10,000, and when the pore size is 0.15 to 0.3 µm, the fractional molecular weight is 30,000.

Further, it is preferred that the membrane has an amount of pure water permeated of 0.1 to 100 $m^3/m^2$·day.

Materials of the membranes include resins such as polyacrylonitrile, acrylonitrile copolymers, 12-nylon, poly(trans-2,5-dimethylpyiperazine terephthalic acid amide), polysulfones, polyvinylidene fluoride, cellulose or derivatives thereof and polyolefins, further surface-modified porous carbon, porous glass and ceramics. Modules may be of any type of the plane membrane fastening type, the spirally wound type, the tube type and the hollow fiber type.

Usually, hollow fiber type modules of resin materials such as polyacrylonitrile are used, and commercial products can be used as such. Such ones include commercially available ones such as DIAFLO, PM-10, YM-10, PM-30, XM-50, XM-100A, XM-300, HIP10, HIP50 and HIP100 (manufactured by Amicon), ACP-0013, ACP-0053, AHP-0013 and SLP-0053 (all are pencil type modules manufactured by Asahi Chemical Industry Co., Ltd.) and HFA, HFM-100 and HFM-180 (manufactured by Abcor).

Although the effective area of the ultrafiltration membrane is appropriately selected depending on its purpose and use, it is usually 1 to 1,000 $dm^2$. Further, the operation pressure is 0.8 to 20 $kg/cm^2$, and the flow rate of metal-containing solutions such as the waste solutions of the washing water, the stabilizing solutions or the like is 0.1 to 10 $ml/cm^2$·minute, and preferably 0.3 to 5 $ml/cm^2$·minute.

The treating method with the ultrafiltration membrane is sufficiently performed by a one-pass system in which a one-stage ultrafiltration membrane module is used and the liquid is once passed through the membrane to separate concentrated water from filtered water. In some cases, however, a multistage one-pass system or a one-stage or multistage circulation system may be used.

In the present invention, the single layer membrane filter used for microfiltration (MF) may be any, as long as it has a pore size of 0.05 to 10 µm, preferably 0.1 to 3 µm and more preferably 0.2 to 1 µm.

As membrane materials of the single layer membrane filters, inexpensive polymers such as polyvinyl chloride, polyethylene, polypropylene and polybutylene are sufficiently used. However, expensive polymers such as polysulfones and polyacrylonitrile can also be used if necessary.

As the single layer membrane filters, specifically, single layer membrane filters of porous polymers, single layer membrane filters of ceramics, and pulp fiber filters if circumstances require, can also be used.

The polymers in the single layer membrane filters of porous polymers include polyvinyl chloride, polyethylene, polypropylene, polybutylene, polysulfones and polyacrylonitrile.

The ceramics in the single layer membrane filters of ceramics include porous glass, clay plates, igneous rock plates and expanded nitrides.

The pulps in the pulp fiber filters usually include filter paper, for example, No. 5A and No. 5C filters.

Of the above-described filters, the single layer membrane filters of porous polymers are preferred in terms of lightness and easy shape formation. Commercial products of these filters include various kinds of Yumiclon membranes manufactured by Yuasa Co., Ltd., Millipore filters (examples thereof include Millipore AA, DA, HA, PH, GS, FG, UC, UM, US, GU and HP) manufactured by Millipore Co., microfiltration filters (SF-301, SF-101, SF-401) manufactured by Kuraray Co., Ltd. and Gore-Tex membranes manufactured by Gore-Tex Co.

Further, fiber filters are also becoming usable, because 0.01-denier fibers (nylon, polypropylene, polyethylene) have been produced.

Of these, a Yumiclin system manufactured by Yuasa Co., Ltd. with which filtration can be conducted even at a lower applied pressure is easily employed.

In the present invention, it is preferred to filter under an uniform pressure of 0.1 to 0.8 $kg/cm^2$·minute, preferably in an enclosed state. This improves filtration performance, and makes it possible to conduct stable filtration in continuous treatment. The flow rate of the waste solution is 30 to 1,000 $ml/cm^2$, though it depends on a filtration unit, and treatment at 1 to 3 BV (bed volume) is required.

Further, a method may also be used in which a filter cartridge of the above-described Yumiclin system is immersed in a waste solution treating solution and suction using a pump is applied to a permeated water side to conduct filtration.

The filtration method according to the above-described single layer membrane filter is sufficiently performed by a one-pass system in which the liquid is once passed through the filter. In some cases, however, a multistage one-pass system or a one-stage or multistage circulation system may also be used.

The shape and the size of the single layer membrane filters are appropriately selected depending on their purpose, use, etc. Preferably, a system is more preferred in which a bag-shaped filter is used, a treating solution is introduced from the outside thereof, and a filtrate is allowed to flow out of the inside of the bag-shaped filter.

In the present invention, either of the UF and the MF as described above or both are appropriately used in combination. In general, a silver concentration of 0.01 ppm or less can be realized by the UF, and a silver concentration of 0.1 ppm by the MF.

When the liquid is returned to a part of the processing tanks, the processing post solution of the cascaded precipitation tanks may be returned as such without using the UF membrane or the MF membrane. This is because it returns to the processing tank and therefore an excessively low silver concentration is not required. Further, this can comply with silver regulations of 1 ppm or less.

In the present invention, the precipitates produced by coordination of silver with the S-containing polymers are products high in value added. As is in the examples shown in the drawings, therefore, they may be recovered from the lower portions of the precipitation tanks or the MF membranes. They are in a sludge state, and handed over to the recovery treaters. They results in processing solutions containing 3 to 6 g/l of silver at this time, which are willingly recovered as valuable waste solutions by the treaters, and the price incomes can also be obtained. They may be filtered through filter bags to sell them as solids to the recovery treaters. The recovery treaters can regenerate silver by burning treatment.

As described above, it is necessary to take out the precipitate (sludge) in the lower portion of the precipitation tank to the outside of the system. In particular, filtration of the sludge through the bag-shaped filter (filter bag) as described above can remove water in the sludge. The sludge is therefore solidified for convenient transportation. The filter bags used in this case include filter bag 100B series and 500 series manufactured by Minnesota Mining and Manufacturing Co., and filter bag CP Filter Polypro manufactured by Chisso Corp.

In the present invention, waste solutions of washing solutions such as the washing water and the stabilizing solutions are preferably used as the photographic processing waste solutions. Washing processing steps using the washing solutions are described.

The washing processing steps means washing of chemicals contained in the silver halide photographic materials after chemical reaction steps of photographic processing of the photographic materials. Although there are a washing processing step in an intermediate portion of the photographic processing steps and a final washing step, both the washing processing steps are included. Specifically, steps called washing processing, stabilization processing and rinsing processing are included.

Further, the washing processing steps have the function of washing out chemicals of prebaths contained in the photographic materials. Basically, therefore, ordinary water such as tap water or well water is used. In some cases, however, deionized water, compounds having the function for easily washing out the prebaths, compounds for improving the keeping quality of the photographic materials after processing and compounds having the function of preventing bacteria from developing in water may be contained in slight amounts.

Furthermore, when water is used, the photographic materials may be washed with a large amount of water (usually referred to as washing), or water replenishing washing at the same level as that of processing solution replenishment depending on photographic material processing (usually referred to rinsing bath washing) may be used.

Still further, in some cases, washing according to pooled water replenishment may be contained.

When water containing a slight amount of a compound (usually also referred to as a stabilizing solution) is used, for example, the compound and the amount added described in JP-A-2-242249 (P4) are preferred. In the washing solution containing a slight amount of this compound, replenishment at the same level as that of processing solution replenishment is preferred from the viewpoint of chemical cost.

As a slight compound for enhancing the washing effect in the intermediate washing processing step, the chelating agent described in JP-A-2-262141 can also be used.

Further, it is preferred that washing processing and rinsing processing in the present invention have the following relation to each other, for example, in the replenishment rate, the processing time and the number of tanks.

The replenishment rate in washing processing is preferably 1.5 times or more that in rinsing processing, and more preferably twice or more. Further, the processing time in washing processing is preferably 1.5 times or more that in rinsing processing, and more preferably twice or more. Furthermore, one rinsing tank is preferably used, whereas 2 to 3 washing tanks are preferably used.

Specifically, the above-described replenishment rate is preferably 400 ml to 2,000 ml per $m^2$ of photographic material and more preferably 500 ml to 1,000 ml for washing processing, and preferably 200 ml or less per $m^2$ of photographic material and more preferably 100 ml or less for rinsing processing. For stabilization processing, the replenishment rate is preferably 1 liter per $m^2$ of photographic material.

Then, the processing solutions used in the washing processing steps are described.

The washing water and the stabilizing solutions used in the washing processing steps are basically composed of tap water or ion-exchanged water as described above.

Various kinds of compounds may be added to the washing water and the stabilizing solutions as described above. Examples of such compounds include hardening agents represented by magnesium salts and aluminum salts, surfactants for preventing drying load and unevenness, brightening agents for improving pure whiteness and sulfites as preservatives. The compounds described in L. E. West, "Water Quality Criteria", Photo. Sci. and Eng., Vol. 9, No. 6 (1965), etc. may be added.

The stabilizing solutions are solutions to which an image stabilizing function impossible to be obtained by washing is given, and therefore, ingredients performing image stabilization are added in addition to the above-described ingredients added to the washing water. They are also referred to as "stabilizers".

Examples of the solutions include solutions to which, for example, formalin, bismuth salts, aqueous ammonia and ammonium salts are added as these ingredients.

The pH of the washing water and the stabilizing solutions is usually about 7. However, it is sometimes shifted to 3 to 9 by solution carryover from prebaths. The temperature of washing or stabilization is 5° to 40° C., and preferably 10° to 35° C. A heater, a temperature controller, a circulating pump, a filter, a floating lid, a squeezee, etc. may be provided in the washing tank or the stabilizing tank, if necessary.

The rinsing solution is similar to the washing water.

The processing solutions having fixing ability in the present invention are the fixing solutions and the bleaching-fixing solutions for color photographic materials.

Fixing agents used in the bleaching-fixing solutions or the fixing solutions are thiosulfates, and in addition, thiocyanates, thioether compounds, thioureas, iodides, etc. can be used in combination therewith. As the preservatives, sulfites, bisulfites, sulfinates or carbonyl bisulfite addition products are preferred.

As bleaching agents used in the bleaching-fixing solutions, there are used, for example, compounds of polyvalent metals such as iron (III), cobalt (III), chromium (VI) and copper (II), peroxides, quinones and nitro compounds. Typical examples of the bleaching agents which can be used include ferricyanates; bichromates; organic complex salts of iron (III) or cobalt (III), for example, complex salts of aminopolycarboxylic acids such as ethylenediaminetetraacetic acid, diethylenetriaminepentaacetic acid, cyclohexanediaminetetraacetic acid, methyliminodiacetic acid, 1,3-diaminopropanetetraacetic acid and glycoletherdiaminetetraacetic acid, citric acid, tartaric acid and malic acid; persulfates; bromates; permanganates; and nitrobenzenes. Of these, the iron (III) complex salts of aminopolycarboxylic acids including the iron (III) complex salt of ethylenediaminetetraacetic acid and the persulfates are preferred from the viewpoints of rapid processing and prevention of environmental pollution. Further, the iron (III) complex salts of aminopolycarboxylic acids are particularly useful. The pH of the bleaching-fixing solutions using these iron (III) complex salts of aminopolycarboxylic acids are usually 5.5 to 8. However, processing can also be conducted at a further lower pH for more rapid processing.

Bleaching promoters can be used in the bleaching-fixing solutions if necessary. Examples of useful bleaching promoters are described in the following specifications: there can be used compounds having mercapto groups or disulfide bonds described in U.S. Pat. No. 3,893,858, West German Patent 1,290,812, JP-A-53-95630, Research Disclosure, No. 17129 (July, 1978), etc.; thiazolidine derivatives described in JP-A-50-140129; thiourea derivatives described in U.S. Pat. No. 3,706,561; iodides described in JP-A-58-16235; polyoxyethylene compounds described in West German Patent 2,748,430; polyamine compounds described in JP-B-45-8836 (the term "JP-B" as used herein means an "examined Japanese patent publication"); and bromide ions. The compounds having mercapto groups or disulfide bonds are preferred among others from the viewpoint of enhanced promoting effect. In particular, the compounds described in U.S. Pat. No. 3,893,858, West German Patent 1,290,812 and JP-A-53-95630 are preferred. Further, compounds described in U.S. Pat. No. 4,552,834 are also preferred.

Further, the processing solutions having fixing ability in processing of the black-and-white photographic materials are the fixing solutions, and the fixing solutions used have a pH of 3.8 or more, and preferably 4.2 to 7.0. Although the fixing agents are thiosulfates as described above, ammonium thiosulfate is particularly preferably used in terms of fixing speed.

The fixing solutions may contain water-soluble aluminum salts acting as hardening agents. Examples thereof include aluminum chloride, aluminum sulfate and potassium alum. Further, there can be used tartaric acid, citric acid, gluconic acid or derivatives thereof alone or two or more of them in the fixing solutions.

Further, the fixing solutions can contain preservatives (for example, sulfites and bisulfites), pH buffers (for example, acetic acid and boric acid), pH regulators (for example, sulfuric acid), chelating agents having water softening ability and compounds described in JP-A-62-78551.

The photographic martials in the present invention may be either color or black-and-white photographic materials. Such ones include, for example, color paper, color negative films, color reversal films, color positive films, color reversal printing paper, photographic materials for plate making, X-ray photographic materials, black-and-white negative films, black-and-white printing paper and photographic materials for microphotography, including ones described above.

In addition to the above, various processing solutions are used for processing of the black-and-white photographic materials and the color photographic materials. Including these processing solutions, for the details of photographic processing, the descriptions of JP-A-3-46652, etc. can be referred to.

The present invention is described according to examples in detail below.

EXAMPLE 1

Using color negative films, Fuji Color Super HG400, manufactured by Fuji Photo Film Co., Ltd. and a color negative automatic developing apparatus FNCP-600 II manufactured by the same company, 1480 films (size of one film: 35 mm in width and 1 m in length) per day were subjected to running processing for 60 days according to the processing steps shown in Table 1. In this case, a color negative processing agent CN-16X manufactured by Fuji Photo Film Co., Ltd. was used as a processing agent. A fixing solution was a fixing processing agent N3X, and washing water was tap water.

TABLE 1

(Color Negative Film)

| Stage | Time | Temperature | Replenishment Rate*[1] | Tank Capacity |
|---|---|---|---|---|
| Color Development | 3 min and 15 sec | 38° C. | 22 ml | 130 liters |
| Bleaching | 3 min | 38° C. | 25 ml | 240 liters |
| Intermediate Washing | 2 min and 10 sec | 38° C. | 15 ml | 80 liters |
| Fixing | 3 min | 38° C. | 15 ml | 165 liters |
| Washing (1)*[2] | 1 min and 5 sec | 38° C. | — | 45 liters |
| Washing (2)*[2] | 2 min and 10 sec | 38° C. | 600 ml | 85 liters |
| Stabilization | 1 min and 5 sec | 38° C. | 31 ml | 45 liters |
| Drying | 3 min | 48° C. | — | — |

*[1]Replenishment rate is per 35 mm in width and 1 m in length.
*[2]Washing is a countercurrent system from (2) to (1).

The fixing waste solution thus obtained was 100 times (by volume) diluted with water to prepare 40 liters of a pseudo washing waste solution. The silver concentration of this washing waste solution was 110 ppm.

Using a silver removing device having the same structure as that of the silver removing device of FIG. 1 with the exception that no polymer precipitate was placed in the lower portions of the precipitation tanks 11 and 12, the above-described washing waste solution was continuously treated. However, a UF unit was installed in place of the MF unit in FIG. 1.

The S-containing polymer used at this time was commercial Epofloc L-2 (manufactured by Miyoshi Oil & Fat Co., Ltd.), a mixture of two kinds of polymers I and II indicated by the following formulas with I:II=9:1 (weight ratio):

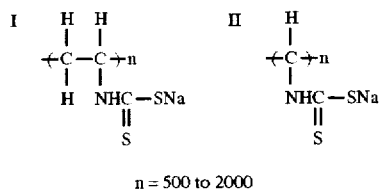

n = 500 to 2000

The stock tank (40 liters in volume) 14 of FIG. 1 was filled with the above-described washing waste solution, and the tank 15 was filled with a 100 wt % solution of Epofloc L-2. The waste solution was sent to the precipitation tank 11 by the liquid feed pump P1 at 100 ml/minute, and the Epofloc solution was added to the precipitation tank 11 at a ratio of 70 μl/minute, followed by continuous processing until the total amount of the washing waste solution reached 10 t. The stock tank 14 and the stock tank 15 were replenished with the washing waste solution and the Epofloc solution, respectively.

In the UF unit, UF Module SLP-3053 manufactured by Asahi Chemical Industry Co., Ltd. (fractional molecular weight: 10,000; average pore size: 0.45 μm; hollow polysulfone fiber membrane; amount permeated: 300 m$^3$/m$^2$·hour; effective membrane area: 4.5 m$^2$) was used as the UF membrane, and the operation pressure was set to 1 kg/cm$^2$. The solution was sent to the UF unit by the liquid feed pump P2 at 20 liters/minute, and the permeated liquid T was allowed to flow out at 100 ml/minute. The concentrated liquid N was returned to the treating space 13A of the precipitation tank 13.

The above-described Epofloc solution was added in such an amount as to give a 1.4-fold excess of an silver equivalent in the washing waste solution. Further, 10 t of the washing waste solution corresponds to about 1111 rounds of running to the capacity (9 liters) of the treating space 11A of the precipitation tank 11.

The precipitation tanks 11, 12 and 13 have tank capacities of 18 liters, 16 liters and 14 liters, respectively, in this order, and the respective treating spaces have capacities of approximately halves of them.

This is taken as waste solution treatment 1A.

Further, in waste solution treatment 1A, treatment was similarly conducted with the exception that treatment was conducted using the silver removing device in which the polymer precipitate was placed in the lower portions of the precipitation tanks 11 and 12, namely the silver removing device of FIG. 1.

As the polymer precipitate, one in which Ag was allowed to coordinate with Epofloc described above was used. In this case, an Ag salt (silver-containing fixing solution) was added to the Epofloc solution to obtain a colloidal precipitate, which was placed in the lower portions of the precipitation tanks 11 and 12 as such. The specific gravity of this precipitate is 1.02 to 1.03, and the number average molecular weight of this polymer is about 270,000 (polymerization degree n=500–2,000). The volume of the precipitate was 300 ml for the precipitation tank 11, and 150 ml for the precipitation tank 12. The clearances between the dividing plates of the precipitation tanks 11, 12 and 13 and a tank bottom face are 2 mm in the height direction.

This is taken as waste solution treatment 1B.

For waste solution treatment 1A and 1B, the amount of Ag contained in the liquids in the treating spaces 11A to 13B of the respective precipitation tanks 11 to 13 and the permeated liquid T was determined by atomic absorption. Results are shown in Table 2.

TABLE 2

| Waste Solution Treatment 1A (no polymer precipitate) | | | | | | | |
|---|---|---|---|---|---|---|---|
| | Ag Amount (ppm) | | | | | | |
| Amount Treated | 10 l | 30 l | 100 l | 300 l | 1 t | 3 t | 10 t |
| Washing Waste Solution | 110 | 110 | 110 | 110 | 110 | 110 | 110 |
| 11A | 35.7 | 38.3 | 36.8 | 39.8 | 34.7 | 35.3 | 34.9 |
| 11B | 39.3 | 39.6 | 36.3 | 32.3 | 22.7 | 12.1 | 8.3 |
| 12A | 34.4 | 37.7 | 31.3 | 32.7 | 19.3 | 7.5 | 8.4 |
| 12B | 38.3 | 38.9 | 32.1 | 30.9 | 11.9 | 4.8 | 2.3 |
| 13A | 36.4 | 36.9 | 30.5 | 30.1 | 11.3 | 4.5 | 2.1 |
| 13B | 37.6 | 39.3 | 29.9 | 26.3 | 7.6 | 3.1 | 1.3 |
| Permeated Liquid | 34.2 | 32.7 | 30.1 | 20.3 | 0.38 | 0.21 | 0.13 |

| Waste Solution Treatment 1B (polymer precipitate) | | | | | | | |
|---|---|---|---|---|---|---|---|
| | Ag Amount (ppm) | | | | | | |
| Amount Treated | 10 l | 30 l | 100 l | 300 l | 1 t | 3 t | 10 t |
| Washing Waste Solution | 112 | 112 | 112 | 112 | 112 | 112 | 112 |
| 11A | 35.2 | 36.3 | 37.9 | 38.4 | 33.3 | 32.9 | 36.8 |
| 11B | 0.53 | 0.47 | 0.52 | 0.84 | 0.75 | 0.69 | 0.61 |
| 12A | 0.54 | 0.39 | 0.53 | 0.63 | 0.67 | 0.57 | 0.53 |
| 12B | 0.46 | 0.27 | 0.30 | 0.22 | 0.25 | 0.34 | 0.41 |
| 13A | 0.21 | 0.17 | 0.24 | 0.18 | 0.19 | 0.19 | 0.23 |
| 13B | 0.20 | 0.18 | 0.21 | 0.11 | 0.15 | 0.11 | 0.11 |
| Permeated Liquid | 0.01 | 0.00 | 0.00 | 0.00 | 0.00 | 0.00 | 0.00 |

As apparent from Table 2, in treatment 1B, the polymer precipitate is previously placed in the precipitation tanks, so that the silver removal effect in the treating space 11B of the precipitation tank 11 is remarkable. Further, even if the amount treated is increased to 10 liters to 10 t, the silver removal effect stable. In contrast, in treatment 1A, the silver removal effect is significantly lowered. This is improved after the insoluble polymer with which Ag coordinates has been formed in the lower portions of the precipitation tanks by treatment. However, Ag in the permeated liquid is not decreased to less than 0.1 ppm even by 10 t treatment.

This is considered to be caused by that although Epofloc L-2 has an average molecular weight of 180,000, some has a molecular weight of only less than 10,000, which is not removed by precipitation prior to arrival at the UF membrane, so that it reaches the UF membrane, whereby silver coordinating with the S-containing polymer passes through the UF membrane and silver thiosulfate passes through the UF membrane without precipitating.

In treatment 1B, therefore, the amount of Ag contained in the permeated water reaches 0 at the stage of 30-liter treatment by treatment according to the UF membrane, whereas in treatment 1A, the Ag amount is large, even if treatment according to the UF membrane is conducted, and a level (Ag<0.1 ppm) in a region in which the discharge standard of silver is rigorous can not be satisfied.

EXAMPLE 2

Using color negative films, Fuji Color Super HG400, manufactured by Fuji Photo Film Co., Ltd. and a color negative automatic developing apparatus FP-560B manufactured by the same company, 100 films (size of one film: 35 mm in width and 1 m in length) per day were subjected to running processing for 60 days according to the processing steps of CN-16FA treatment. In this case, a color negative processing agent CN-16X manufactured by Fuji Photo Film Co., Ltd. was used as a processing agent. A fixing solution was a fixing processing agent N3X, and washing water was tap water.

In the above, a fixing tank of the automatic developing apparatus was equipped with the silver removing device of FIG. 1 in a manner similar to that of FIG. 5, an overflow was introduced for treatment, and the overflow of the precipitation tank 13 was returned to the fixing tank to conduct treatment. As a result, the replenishment rate of the fixing solution could be reduced to 8 ml, about a half, per 35 mm in width and 1 m in length of photographic material. The silver removing device had the same structure as with treatment 1B of Example 1, with the proviso that no UF unit is provided.

EXAMPLE 3

Using color paper Super FAV manufactured by Fuji Photo Film Co., Ltd. and a color paper developing apparatus FPRP-214K manufactured by the same company, running processing was carried out in a treating amount of 80 m² per day for the same period as with Example 2 according to the processing steps shown in Table 3. In this case, a color paper processing agent CP-45X manufactured by Fuji Photo Film Co., Ltd. was used as a processing agent. A bleaching-fixing solution was a bleaching-fixing processing agent P2X, and washing water was tap water.

TABLE 3

| (Color Paper) | | | | |
|---|---|---|---|---|
| Stage | Time | Temperature | Repleni- shment Rate*³ | Tank Capacity |
| Color Development | 45 sec | 35° C. | 73 ml | 120 liters |
| Bleaching- Fixing | 45 sec | 35° C. | 218 ml | 120 liters |

TABLE 3-continued

| (Color Paper) | | | | |
|---|---|---|---|---|
| Stage | Time | Temperature | Repleni- shment Rate*³ | Tank Capacity |
| Washing (1)*⁴ | 30 sec | 35° C. | — | 60 liters |
| Washing (2)*⁴ | 30 sec | 35° C. | — | 60 liters |
| Washing (3)*⁴ | 30 sec | 35° C. | 800 ml | 60 liters |
| Drying | 90 sec | 60° C. | — | — |

*³⁾Replenishment rate is per mm².
*⁴⁾Washing is a countercurrent system of (3) → (2) → (1).

The amount of the bleaching-fixing solution brought from the bleaching-fixing tank into the washing tank by the photographic material is 37 ml per m² of photographic material.

In the above, a first washing tank of the automatic developing apparatus was equipped with the silver removing device of FIG. 1 in a manner similar to that of FIG. 6, an overflow was introduced for treatment, and the overflow of the precipitation tank 13 was returned to a second washing tank to conduct treatment. As a result, the replenishment rate of the washing water could be reduced to 180 ml per m² of photographic material.

The silver removing device had the same structure as with treatment 1B of Example 1, with the proviso that no UF unit is provided.

In waste solution treatment 1B of Example 1 and the silver removing devices of Examples 2 and 3, the silver-coordinated polymer precipitates existing in the lower portions of the precipitation tanks were finally handed to the recovery treaters as sludge.

According to the present invention, the removal of silver from the photographic processing waste solutions can be efficiently performed by continuous treatment, so that it becomes possible to satisfy a level of the discharge standard of silver. Further, for the processing solutions having fixing ability and the washing water, the reuse becomes possible.

What is claimed is:

1. A process for treating a photographic processing waste solution which comprises:

placing a polymer precipitate having a S atom which can coordinate with a metal in a lower portion of a tank having a U-shaped treating space which comprises (i) a first partition, (ii) a second partition and (iii) an interconnecting partition for interconnecting said first partition and said second partition in said lower portion of a tank;

introducing into said first partition a photographic processing waste solution containing a processing solution having fixing ability which has processed a silver halide photographic material;

treating said photographic processing waste solution by passing said photographic processing waste solution through said interconnecting partition containing as a seed crystal said polymer precipitate having a S atom which can coordinate with a metal in said U-shaped treating space; and removing said metal in said photographic processing waste solution;

wherein a plurality of tanks each having said U-shaped treating space are provided and said photographic waste solution is allowed to flow in from a preceding stage tank to a subsequent stage tank in turn.

2. The process for treating a photographic processing waste solution according to claim 1, wherein said polymer precipitate is a colloidal precipitate.

3. The process for treating a photographic processing waste solution according to claim 1, wherein said polymer precipitate is a precipitate obtained by insolubilizing a water-soluble polymer having a S atom which can coordinate with a metal, wherein said insolubilizing is carried out by coordination of metals or polymerization by bonding of polymers to each other.

4. The process for treating a photographic processing waste solution according to claim 1, further comprising filtering said solution after the treatment in the presence of said polymer having a S atom which can coordinate with a metal.

5. The process for treating a photographic processing waste solution according to claim 1, wherein said photographic processing waste solution contains silver.

* * * * *